US012631192B2

(12) United States Patent
Wu et al.

(10) Patent No.: US 12,631,192 B2
(45) Date of Patent: May 19, 2026

(54) MAGLEV AIR COMPRESSOR WITH IMPELLER ASSEMBLIES

(71) Applicant: RAETTS INTELLIGENT EQUIPMENT (GUANGDONG) CO., LTD., Dongguan (CN)

(72) Inventors: Yanguang Wu, Dongguan (CN); Pan Xie, Dongguan (CN); Jian Yang, Dongguan (CN); Maosheng Liang, Dongguan (CN); Baihe Hu, Dongguan (CN); Biao Zhang, Dongguan (CN); Shaohong Huang, Dongguan (CN)

(73) Assignee: RAETTS INTELLIGENT EQUIPMENT (GUANGDONG) CO., LTD., Guangdong (CN)

( * ) Notice: Subject to any disclaimer, the term of this patent is extended or adjusted under 35 U.S.C. 154(b) by 0 days.

(21) Appl. No.: 18/901,555

(22) Filed: Sep. 30, 2024

(65) Prior Publication Data

US 2025/0305508 A1    Oct. 2, 2025

(30) Foreign Application Priority Data

Apr. 1, 2024    (CN) .......................... 202410393145.6

(51) Int. Cl.
*F04D 29/058* (2006.01)
*F04D 17/10* (2006.01)
(Continued)

(52) U.S. Cl.
CPC ........... *F04D 29/058* (2013.01); *F04D 17/10* (2013.01); *F04D 29/441* (2013.01); *F04D 29/5806* (2013.01); *H02K 11/21* (2016.01)

(58) Field of Classification Search
CPC .. F04D 29/058; F04D 29/441; F04D 29/5806; F04D 29/023; F04D 29/284;
(Continued)

(56) References Cited

U.S. PATENT DOCUMENTS 4,023,920 A * 5/1977 Bachler ................... F16C 35/00
                                                        417/372
5,310,311 A * 5/1994 Andres ...................... F02C 6/06
                                                        415/214.1
(Continued)

FOREIGN PATENT DOCUMENTS

CN          1242638 A  *  1/2000
CN      216477915 U      5/2022
(Continued)

OTHER PUBLICATIONS

Fremerey et al. DE 10216447 Espacenet—English Machine Translation (Year: 2003).*

(Continued)

*Primary Examiner* — Nathaniel E Wiehe
*Assistant Examiner* — Wayne A Lambert
(74) *Attorney, Agent, or Firm* — MUNCY, GEISSLER, OLDS & LOWE, P.C.

(57) ABSTRACT

The present application discloses a maglev air compressor, which includes a compressor housing, a motor stator, a rotor, a first impeller assembly and a second impeller assembly subjectable to an axial magnetic force and a control module. The compressor housing, the motor stator and the rotor are sleeved sequentially, both ends of the rotor are rotatably connected to an inside of the compressor housing through a maglev bearing group, the first impeller assembly and the second impeller assembly are fixedly oppositely installed on the both ends of the rotor. The maglev bearing group includes: a first thrust bearing piece generating a first axial magnetic force to the first impeller assembly, and, a second thrust bearing piece generating a second axial magnetic force to the second impeller assembly.

13 Claims, 9 Drawing Sheets

(51) Int. Cl.

| | |
|---|---|
| *F04D 29/44* | (2006.01) |
| *F04D 29/58* | (2006.01) |
| *H02K 11/21* | (2016.01) |

(58) Field of Classification Search

CPC ...... F04D 29/582; F04D 29/662; F04D 17/10; F04D 25/0606; F04D 25/051; F04D 25/584; F04D 25/08; F04D 25/163; H02K 11/21; H02K 7/09; H02K 1/20; H02K 1/32; H02K 5/203; H02K 5/207; H02K 9/04; H02K 9/19

See application file for complete search history.

(56) References Cited

U.S. PATENT DOCUMENTS

| | | | | |
|---|---|---|---|---|
| 6,310,414 | B1 * | 10/2001 | Agahi | F01D 3/04 |
| | | | | 415/105 |
| 7,675,209 | B2 * | 3/2010 | Masoudipour | H02K 5/203 |
| | | | | 310/89 |
| 9,874,224 | B2 * | 1/2018 | Morita | F04D 17/10 |
| 2001/0033792 | A1 * | 10/2001 | Nagaoka | F04D 1/06 |
| | | | | 415/208.3 |
| 2009/0015012 | A1 * | 1/2009 | Metzler | F04D 29/058 |
| | | | | 415/173.1 |
| 2013/0017062 | A1 * | 1/2013 | Kochetov | F01D 25/16 |
| | | | | 415/14 |
| 2014/0017078 | A1 * | 1/2014 | Krehbiel | F04D 29/058 |
| | | | | 415/229 |
| 2014/0271170 | A1 * | 9/2014 | Holbrook | F04D 29/30 |
| | | | | 415/208.3 |
| 2015/0275911 | A1 * | 10/2015 | Carrasco | F04D 25/06 |
| | | | | 417/423.12 |
| 2015/0292330 | A1 * | 10/2015 | Wiebe | F04D 25/0606 |
| | | | | 29/889.21 |
| 2017/0198720 | A1 * | 7/2017 | Umeda | F25B 31/008 |
| 2017/0268806 | A1 * | 9/2017 | Knopp | H02K 7/003 |
| 2018/0045750 | A1 * | 2/2018 | McGuire | G01P 3/487 |
| 2018/0073779 | A1 * | 3/2018 | Johnson | F04D 27/004 |
| 2018/0355891 | A1 * | 12/2018 | Nagao | F04D 29/058 |
| 2019/0170151 | A1 * | 6/2019 | Sakawaki | F04D 27/001 |
| 2021/0341016 | A1 * | 11/2021 | Liu | F04D 29/624 |
| 2022/0003238 | A1 * | 1/2022 | Liu | F04D 29/624 |
| 2022/0049709 | A1 * | 2/2022 | Echenique | F04D 29/058 |

FOREIGN PATENT DOCUMENTS

| | | | | | |
|---|---|---|---|---|---|
| CN | 115355250 A | * | 11/2022 | | F16C 37/005 |
| CN | 115492856 A | | 12/2022 | | |
| CN | 117108526 A | | 11/2023 | | |
| DE | 10216447 C1 | * | 9/2003 | | F04D 29/058 |
| EP | 3683464 A1 | * | 7/2020 | | F16C 37/005 |
| FI | 20215942 A1 | * | 12/2022 | | H02K 11/215 |
| GB | 2335242 A | * | 9/1999 | | F04D 25/062 |
| JP | 06200938 A | * | 7/1994 | | |
| JP | H1162877 A | * | 3/1999 | | F04D 25/0606 |
| JP | 2003174742 A | * | 6/2003 | | F04D 29/058 |
| KR | 100853658 B1 | * | 8/2008 | | F04D 29/002 |
| WO | WO-8700360 A1 | * | 1/1987 | | F16C 32/0493 |
| WO | WO-2013160274 A1 | * | 10/2013 | | F04D 29/584 |

OTHER PUBLICATIONS

Hasegawa et al. JP 2003174742 Espacenet—English Machine Translation (Year: 2003).*

Hu et al. CN 216477915 Espacenet—English Machine Translation (Year: 2022).*

Lee et al. KR 100853658 Espacenet—English Machine Translation (Year: 2008).*

Yoshiumi et al. JP06200938A_Englishn Machine Translation (Year: 1994).*

Zacharias WO 2013160274 Espacenet—English Machine Translation (Year: 2013).*

* cited by examiner

Control Module  106

114    101a    101    101b    1

115

108    118c    118b    109

112    102    103    113
112a    112b    113a    113b    113c 110
110a
110b
111a
111
104
111b
111c
105
114
115

107a    107c    107d    107b
107

104

105

105a

105b 105a-1

107h

107g

107i

107j

107d

111a

111b

111c

113a

113b

113c

109b

109

109c

101

118

MAGLEV AIR COMPRESSOR WITH IMPELLER ASSEMBLIES

CROSS-REFERENCE TO RELATED APPLICATION

This application claims priority to Chinese Patent Application No. CN202410393145.6 filed on Apr. 1, 2024, the entire content of which is hereby incorporated by reference.

FIELD OF TECHNOLOGY

The present application relates to the technical field of maglev motor, and in particular to a maglev air compressor.

BACKGROUND

A traditional maglev air compressor adopts electromagnetic suspension technology, a rotor and a motor are suspended without contact through magnetic force. A magnet and coils inside a maglev motor constitute a static part and a dynamic part, respectively. When current passes through the coils, magnetic field is generated, the magnetic field interacts with the magnet on the rotor, generating an upward levitation force. The levitation force is equal to a gravity of the rotor, thus keeping the rotor suspended in the air. When a direction of the current is changed, a direction of the magnetic field is changed, thus generating different suspension forces, realizing a reciprocating motion of the rotor to drive a compression mechanism to work.

When the traditional maglev air compressor is working, there will be an axial force imbalance. Under an action of an unbalanced axial force, a rotating shaft of the maglev air compressor will carry out an uncertain axial movement. In order to prevent the uncertain axial movement of a rotor spindle, bearings are sleeved on the rotor spindle for support, and a thrust disk is provided between the bearings to counteract the axial force and prevent the rotor spindle from moving more than expected. However, the thrust disk requires an additional space for installation, which leads to a corresponding increase in a length of the rotating shaft of the maglev air compressor.

SUMMARY

A purpose of the present application is to provide maglev air compressor without a thrust disk structure, shortening a rotating shaft, improving a critical rotation speed of the rotating shaft.

A maglev air compressor, including:

a compressor housing, a motor stator, a rotor, a first impeller assembly and a second impeller assembly subjectable to an axial magnetic force and a control module, wherein, the compressor housing, the motor stator and the rotor are sleeved sequentially, both ends of the rotor are rotatably connected to an inside of the compressor housing through a maglev bearing group, the first impeller assembly and the second impeller assembly are fixedly oppositely installed on the both ends of the rotor;

wherein, the maglev bearing group includes: a first thrust bearing piece generating a first axial magnetic force to the first impeller assembly, and, a second thrust bearing piece generating a second axial magnetic force to the second impeller assembly, the control module is electrically connected to the first thrust bearing piece and the second thrust bearing piece respectively; the control module controls the first thrust bearing piece and second thrust bearing piece respectively to generate the first axial magnetic force and the second axial magnetic force to the first impeller assembly and the second impeller assembly; wherein, a sum of vectors of the first axial magnetic force and the second axial magnetic force is configured to counteract an axial force received by the rotor.

For better understanding, a detailed description of the present application is given with accompanying drawings.

BRIEF DESCRIPTION

FIG. 1 a schematic structural diagram of a maglev air compressor of the present application;

DETAILED DESCRIPTION

In order to make objects, technical schemes and advantages of the present application more clear, embodiments of the present application will be described in further detail below with reference to the accompanying drawings.

A maglev air compressor of the present application replaces a prior thrust disk structure with a first thrust bearing piece and a second thrust bearing piece that generate a first axial magnetic force and a second axial magnetic force, thus counteracting an axial force received by a rotor. An air cooling structure and a water cooling structure are provided independently at the same time, improving a heat dissipation.

Figures 1, 2:
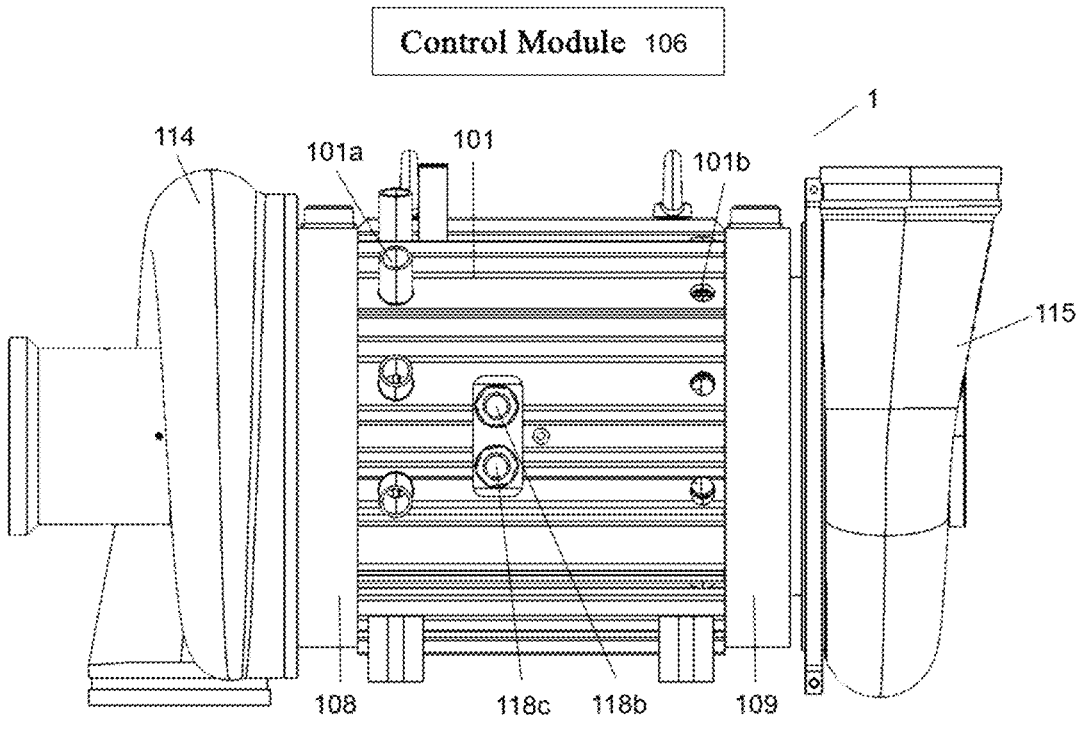
FIG. 2 is a schematic cross-sectional diagram of the maglev air compressor of the present application.
Figure 3:
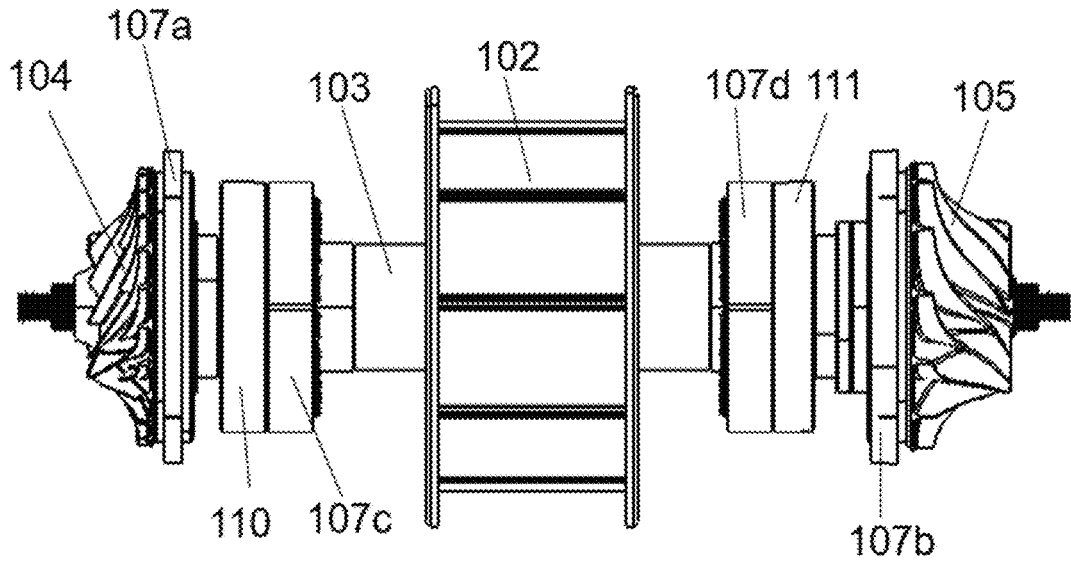
FIG. 3 is a schematic partial structural diagram of the maglev air compressor of the present application.

Please refer to FIG. 1, FIG. 2 and FIG. 3. FIG. 1 is a schematic structural diagram of the maglev air compressor of the present application. FIG. 2 is a schematic cross-sectional diagram of the maglev air compressor of the present application. FIG. 3 is a schematic partial structural diagram of the maglev air compressor of the present application.

The present application discloses the maglev air compressor 1, including a compressor housing 101, a motor stator 102, the rotor 103, a first impeller assembly 104 that may be subjected to an axial magnetic force, a second impeller assembly 105 that may be subjected to an axial magnetic force and a control module 106. The compressor housing 101, the motor stator 102 and the rotor 103 are sequentially sleeved from outside to inside. Both ends of the rotor 103 are rotatably connected to an inside of the compressor housing 101 through a maglev bearing group 107. The first impeller assembly 104 and the second impeller assembly 105 are fixedly installed to both ends of the rotor 103 facing each other respectively.

The maglev bearing group 107 includes: the first thrust bearing piece 107a that generates the first axial magnetic force on the first impeller assembly 104, and the second thrust bearing piece 107b that generates the second axial magnetic force on the second impeller assembly 105. The control module 106 is electrically connected to the first thrust bearing piece 107a and the second thrust bearing piece 107b respectively. The control module 106 controls the first thrust bearing piece 107a and the second thrust bearing piece 107b respectively, generating the first axial magnetic force on the first impeller assembly 104 and the second axial magnetic force on the second impeller assembly 105. Wherein, a sum of vectors of the first axial magnetic force and the second axial magnetic force is configured to counteract the axial force on the rotor 103. In one embodiment, the control module 106 is a maglev controller. Of course, in other embodiments, the control module 106 may be a motor controller, or a combination of the maglev controller and the motor controller. The control module 106 is electrically connected to the first thrust bearing piece 107a and the second thrust bearing piece 107b respectively, and controls the first thrust bearing piece 107a and the second thrust bearing piece 107b, generating the first axial magnetic force and the second axial magnetic force on the first impeller assembly 104 and the second impeller assembly 105.

The control module 106 controls a magnitude and a direction of a current of the first thrust bearing piece 107a and the second thrust bearing piece 107b, thus generates magnetic fields accordingly, generating the first axial magnetic force and the second axial magnetic force on the first impeller assembly 104 and the second impeller assembly 105. The sum of vectors of the first axial magnetic force and the second axial magnetic force is configured to counteract the axial force generated through a high-speed rotation of the rotor 103. The present application discloses the maglev air compressor that may eliminate the thrust disk structure configured to counteract the axial force on the rotor 103 in a conventional maglev air compressor, thus shortening lengths of the rotor 103 and an overall machine, improving a rigid of the rotor 103, improving a critical rotating speed of the rotor 103, and effectively improving a pressure value of compressed air in the maglev air compressor 1.

In this embodiment, the first thrust bearing piece 107a and the first impeller assembly 104 are adjacently provided along an axial direction of the rotor 103, respectively. And the first thrust bearing piece 107a is located at an inner side of the first impeller assembly 104. The second thrust bearing piece 107b and the second impeller assembly 105 are adjacently provided along an axial direction of the rotor 103, respectively. And the second thrust bearing piece 107b is located at an inner side of the second impeller assembly 105.

Since the motor stator 102 is close to a central part of the axial direction of the rotor 103, the first impeller assembly 104 and the second impeller assembly 105 are located at both ends of the rotor 103 respectively. Thus the first thrust bearing piece 107a and the second thrust bearing piece 107b are provided adjacent to the first impeller assembly 104 and the second impeller assembly 105 respectively, far away from an electromagnetic field region generated by the motor stator 102, reducing eddy current phenomena of the first thrust bearing piece 107a and the second thrust bearing piece 107b in the electromagnetic field region generated by the motor stator 102 during operation of the maglev air compressor 1. Therefore, temperatures of the first thrust bearing piece 107a and the second thrust bearing piece 107b will not exceed their maximum withstand temperature, reducing heat dissipation requirements of the first thrust bearing piece 107a and the second thrust bearing piece 107b, no additional heat dissipation apparatus is required for heat dissipations of the first thrust bearing piece 107a and the second thrust bearing piece 107b. A cost is effectively saved. At the same time, compared with a condition that a heat dissipation apparatus for the first thrust bearing piece 107a and a heat dissipation apparatus for the second thrust bearing piece 107b are provided, installation spaces for the heat dissipation apparatus of the first thrust bearing piece 107a and the heat dissipation apparatus of the second thrust bearing piece 107b are not required, which may shorten the lengths of the rotor 103 and the overall machine, improving the rigid of the rotor 103, thus improving the critical rotating speed of the rotor 103, effectively improving the pressure value of compressed air in the maglev air compressor 1.

In other embodiments, the first thrust bearing piece 107a may be located at an outer side of the first impeller assembly 104, the second thrust bearing piece 107b may be located at an outer side of the second impeller assembly 105. Or, the first thrust bearing piece 107a and the first impeller assembly 104 may be not adjacently provided, another structure is provided in a middle, such as cooling structure and the like. The second thrust bearing piece 107b and the second impeller assembly 105 may be not adjacently provided, another structure is provided in a middle, such as a cooling structure and the like.

Figure 4:
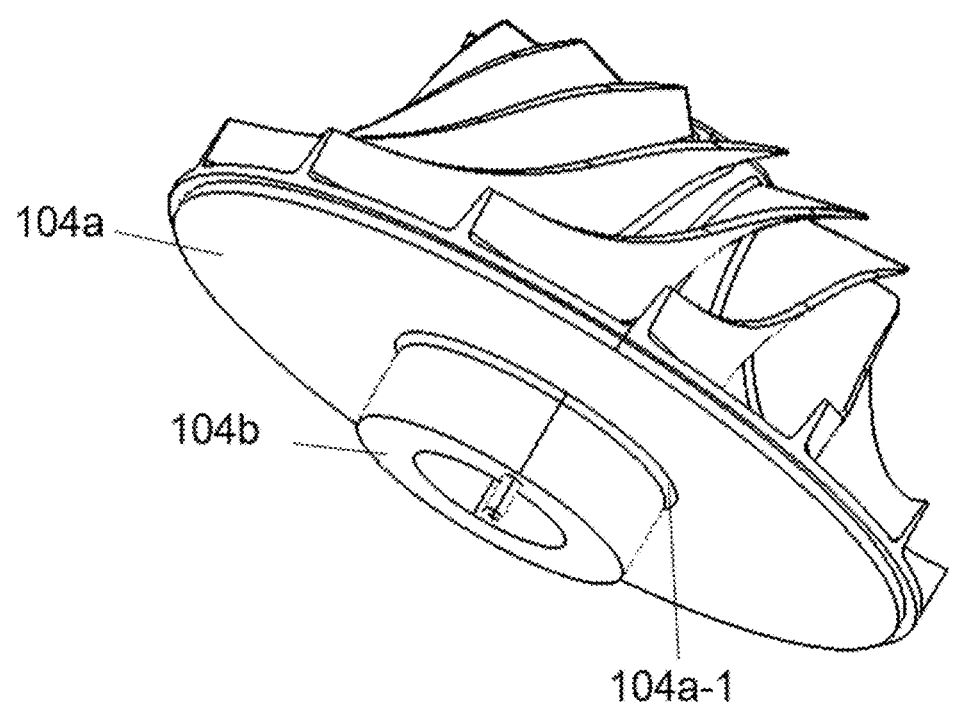
FIG. 4 is a schematic structural diagram of a first impeller assembly of the maglev air compressor of the present application.
Figures 5, 6:
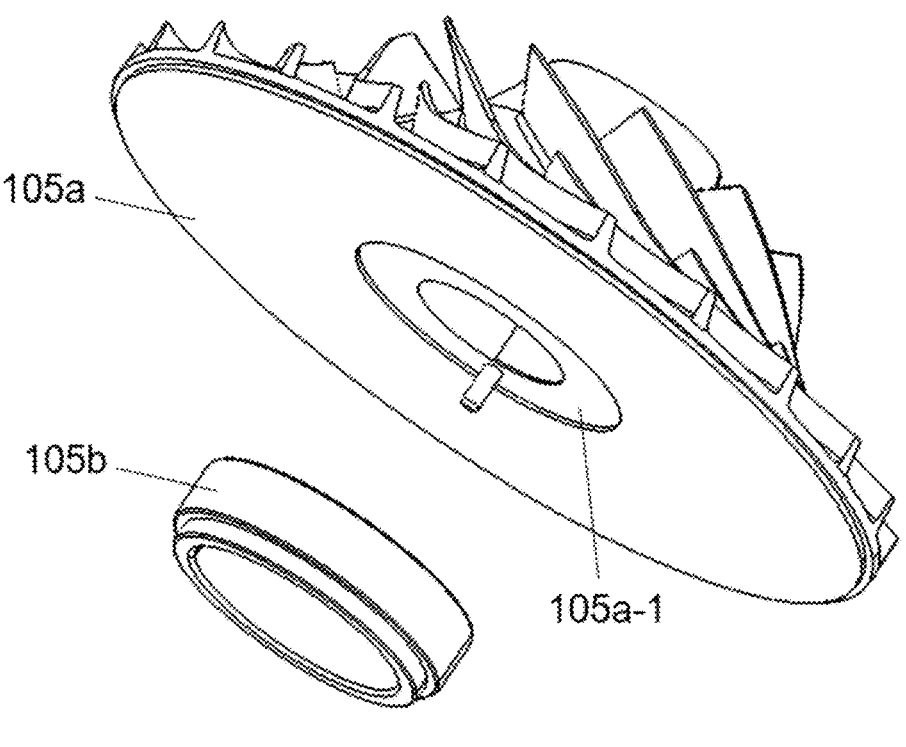
FIG. 5 is a schematic structural diagram of a second impeller assembly of the maglev air compressor of the present application.
FIG. 6 is a schematic structural diagram of a first thrust bearing piece of the maglev air compressor of the present application.

Please refer to FIG. 4 and FIG. 5. FIG. 4 is a schematic structural diagram of the first impeller assembly of the maglev air compressor of the present application. FIG. 5 is a schematic structural diagram of the second impeller assembly of the maglev air compressor of the present application. In this embodiment, the first impeller assembly 104 includes a first impeller 104a that made of magnetic material, the second impeller assembly 105 includes a second impeller 105a that made of magnetic material. The magnetic material is a ferromagnetic metal or ferromagnetic alloy, such as 17-4 stainless steel. Of course, in other embodiments, the magnetic material may be other magnetic materials such as a nickel-iron alloy according to actual requirements.

Please refer to FIG. 6. FIG. 6 is a schematic structural diagram of the first thrust bearing piece of the maglev air compressor of the present application. The first thrust bearing piece 107*a* includes a first thrust bearing base 107*g* and a coil winding 107*h*. A rotor perforation 107*i* is provided on a center of the first thrust bearing base 107*g*, and an annular coil winding mounting portion 107*j* is radially spaced apart from the rotor perforation 107*i*. The coil winding 107*h* is installed in the coil winding mounting portion 107*j*, and provided around the rotor perforation 107*i*. Since a structure of the second thrust bearing piece 107*b* is as same as a structure of the first thrust bearing piece 107*a*, thus it will not be explained in detail herein.

The control module 106 controls a magnitude and a direction of a current flowing to the coil winding 107*h*, generating magnetic fields with different magnetic induction intensities and different directions accordingly. Thus the first impeller 104*a* is subjected to the first axial magnetic force in a magnetic field generated by the first thrust bearing piece 107*a*, a magnitude and a direction of the first axial magnetic force are affected the magnetic field generated by the first thrust bearing piece 107*a*. Similarly, the second impeller 105*a* is subjected to the second axial magnetic force generated in a magnetic field generated by the second thrust bearing piece 107*b*.

In one embodiment, the direction of the first axial magnetic force is opposite to a direction of the second axial magnetic force. The first axial magnetic force received by the first impeller 104*a* is an inward suction force along the axial direction of the rotor 103. The second axial magnetic force received by the second impeller 105*a* is an inward suction force along the axial direction of the rotor 103. The sum of vectors of the first axial magnetic force and the second axial magnetic force is configured to counteract the axial force generated through the high-speed rotation of the rotor 103, effectively preventing the first impeller 104*a* and the second impeller 105*a* from a scratch damage generated by an axially displacement of the rotor 103.

In other embodiments, the first axial magnetic force received by the first impeller 104*a* is an outward thrust force along the axial direction of the rotor 103. The second axial magnetic force received by the second impeller 105*a* is an outward thrust force along the axial direction of the rotor 103. The sum of vectors of the first axial magnetic force and the second axial magnetic force is configured to counteract the axial force generated through the high-speed rotation of the rotor 103.

In another embodiment, the first impeller assembly 104 includes the first impeller 104*a* and a first magnetic piece 104*b*. The first magnetic piece 104*b* is installed inside the first impeller 104*a*. The second impeller assembly 105 includes the second impeller 105*a* and a second magnetic piece 105*b*. The second magnetic piece 105*b* is installed inside the second impeller 105*a*. In this type of embodiments, the first impeller assembly 104 and the second impeller assembly 105 may not be entirely made of magnetic material, rather, only the first magnetic piece 104*b* and the second magnetic piece 105*b* provided therein are made of magnets or magnetic materials.

Wherein, the first magnetic piece 104*b* and the second magnetic piece 105*b* may be a magnet, a ferromagnetic metal or a ferromagnetic alloy, in this embodiment are 17-4 stainless steel material. A first groove 104*a*-1 is provided on a side surface of the first impeller 104*a* facing the second impeller 105*a*. The first magnetic piece 104*b* is snap-fittedly installed into the first groove 104*a*-1. A second groove 105*a*-1 is provided on a side surface of the second impeller 105*a* facing the first impeller 104*a*. The second magnetic piece 105*b* is snap-fittedly installed into the second groove 105*a*-1. This makes that the first impeller assembly 104 and the first thrust bearing piece 107*a*, the second impeller 105*a* and the second thrust bearing piece 107*b*. In this embodiment, the first groove 104*a*-1 and the second groove 105*a*-1 are annular grooves, the first magnetic piece 104*b* and the second magnetic piece 105*b* also are annular shapes. Of course, according to actual requirements, the first magnetic piece 104*b* and the second magnetic piece 105*b* may be selected as other magnetic materials such as nickel-iron alloy. The first groove 104*a*-1 and the second groove 105*a*-1 may be square-shaped grooves, and shapes of the first magnetic piece 104*b* and the second magnetic piece 105*b* are adjusted according to shapes of the first groove 104*a*-1 and the second groove 105*a*-1.

The control module 106 controls the magnitude and the direction of the current flowing to the coil winding 107*h*, generating magnetic fields with different magnetic induction intensities and different directions accordingly. Thus the first magnetic piece 104*b* is subjected to the first axial magnetic force in the magnetic field generated by the first thrust bearing piece 107*a*, the magnitude and the direction of the first axial magnetic force are affected the magnetic field generated by the first thrust bearing piece 107*a*. Similarly, the second magnetic piece 105*b* is subjected to the second axial magnetic force in the magnetic field generated by the second thrust bearing piece 107*b*.

In one embodiment, the direction of the first axial magnetic force is opposite to the direction of the second axial magnetic force. The first axial magnetic force received by the first magnetic piece 104*b* is an inward suction force along the axial direction of the rotor 103, and the first axial magnetic force received by the first magnetic piece 104*b* acts on the first impeller 104*a*. The second axial magnetic force received by the second magnetic piece 105*b* is an inward suction force along the axial direction of the rotor 103, and the second axial magnetic force received by the second magnetic piece 105*b* acts on the second impeller 105*a*. The sum of vectors of the first axial magnetic force and the second axial magnetic force is configured to counteract the axial force generated through the high-speed rotation of the rotor 103. This may effectively prevent the first impeller 104*a* and the second impeller 105*a* from the scratch damage generated by the axially displacement of the rotor 103.

In other embodiments, the first axial magnetic force received by the first magnetic piece 104*b* is an outward thrust force along the axial direction of the rotor 103, and the first axial magnetic force received by the first magnetic piece 104*b* acts on the first impeller 104*a*. The second axial magnetic force received by the second magnetic piece 105*b* is an outward thrust force along the axial direction of the rotor 103, and the second axial magnetic force received by the second magnetic piece 105*b* acts on the second impeller 105*a*. The sum of vectors of the first axial magnetic force and the second axial magnetic force is configured to counteract the axial force generated through the high-speed rotation of the rotor 103.

In other embodiments, both the first magnetic piece 104*b* and the second magnetic piece 105*b* may be magnetic coatings, the first magnetic piece 104*b* is evenly coated on one side facing the second impeller 105*a*, the second magnetic piece 105b is evenly coated on one side facing the first impeller 104a, thus saving processing costs.

Figure 7:
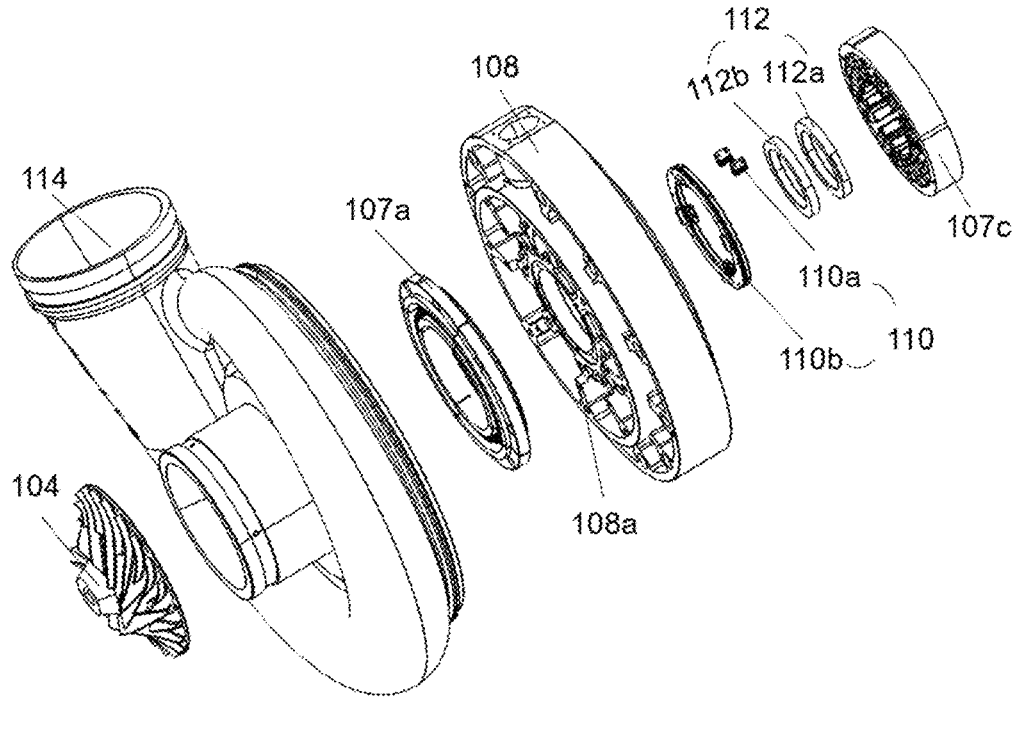
FIG. 7 is a schematic partial explosion diagram of the first impeller assembly, a first volute, the first thrust bearing piece, a first shroud, a first position detection apparatus, a first sensing component and a first radial bearing piece of the maglev air compressor of the present application.
Figure 8:
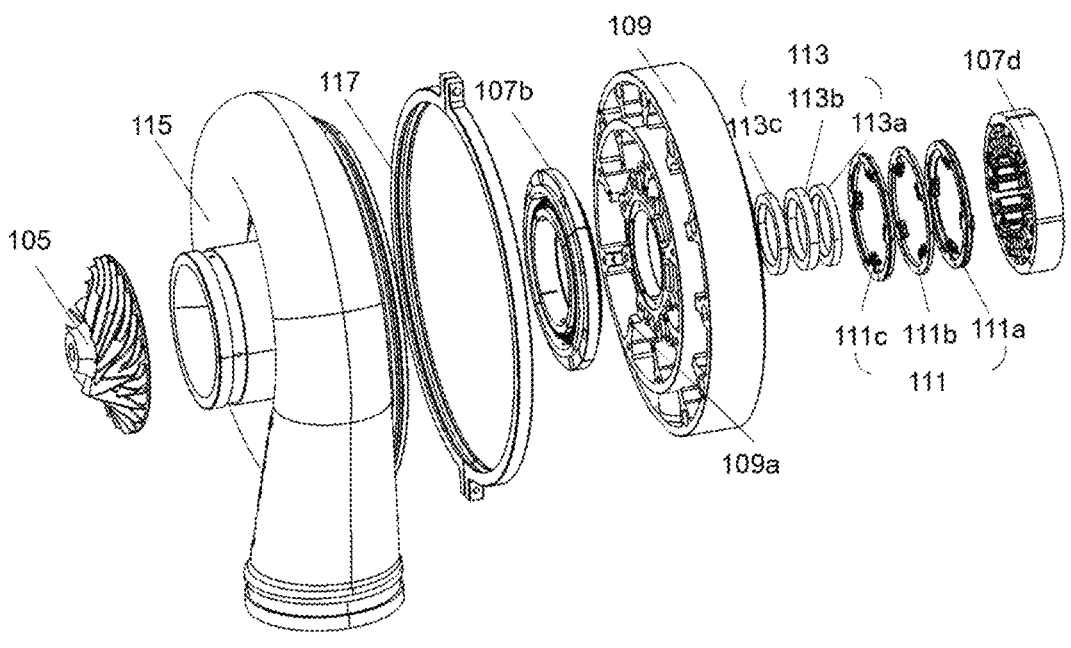
FIG. 8 is a schematic partial explosion diagram of the second impeller assembly, a second volute, a second thrust bearing piece, a second shroud, a second position detection apparatus, a second sensing component and a second radial bearing piece of the maglev air compressor of the present application.

Please refer to FIG. 7 and FIG. 8. FIG. 7 is a schematic partial explosion diagram of the first impeller assembly, a first volute, the first thrust bearing piece, a first shroud, a first position detection apparatus, a first sensing component and a first radial bearing piece of the maglev air compressor of the present application. FIG. 8 is a schematic partial explosion diagram of the second impeller assembly, a second volute, a second thrust bearing piece, a second shroud, a second position detection apparatus, a second sensing component and a second radial bearing piece of the maglev air compressor of the present application.

In this embodiment, the maglev air compressor 1 further includes the first shroud 108 and the second shroud 109. One end of the first shroud 108 and one end of the second shroud 109 are assembled with both ends of the compressor housing 101, respectively. The first thrust bearing piece 107a and the second thrust bearing piece 107b are assembled with ends of the first shroud 108 and the second shroud 109 away from the compressor housing 101, respectively. Both ends of the rotor 103 pass through the first shroud 108 and the second shroud 109, the first thrust bearing piece 107a and the second thrust bearing piece 107b respectively, and are assembled with corresponding impeller assemblies. A movable gap is provided between the first thrust bearing piece 107a and the bottom of the corresponding impeller assembly and between the second thrust bearing piece 107b and the bottom of the corresponding impeller assembly.

A first thrust bearing piece mounting hole 108a and a second thrust bearing piece mounting hole 109a are provided on one end of the first shroud 108 and one end of the second shroud 109 away from the compressor housing 101, respectively. The first thrust bearing piece mounting hole 108a and the second thrust bearing piece mounting hole 109a may be screw holes, the first thrust bearing piece 107a and the second thrust bearing piece 107b are installed in the first thrust bearing piece mounting hole 108a and the second thrust bearing piece mounting hole 109a through screw fixing. Of course, in other embodiments, to improve stabilities of the first thrust bearing piece 107a and the second thrust bearing piece 107b respectively assembled on the end of the first shroud 108 and the end of the second shroud 109 away from the compressor housing 101, the first thrust bearing piece mounting hole 108a and the second thrust bearing piece mounting hole 109a may also be bolt holes, the first thrust bearing piece 107a and the second thrust bearing piece 107b are installed in the first thrust bearing piece mounting hole 108a and the second thrust bearing piece mounting hole 109a through bolt fixing.

Figure 9:
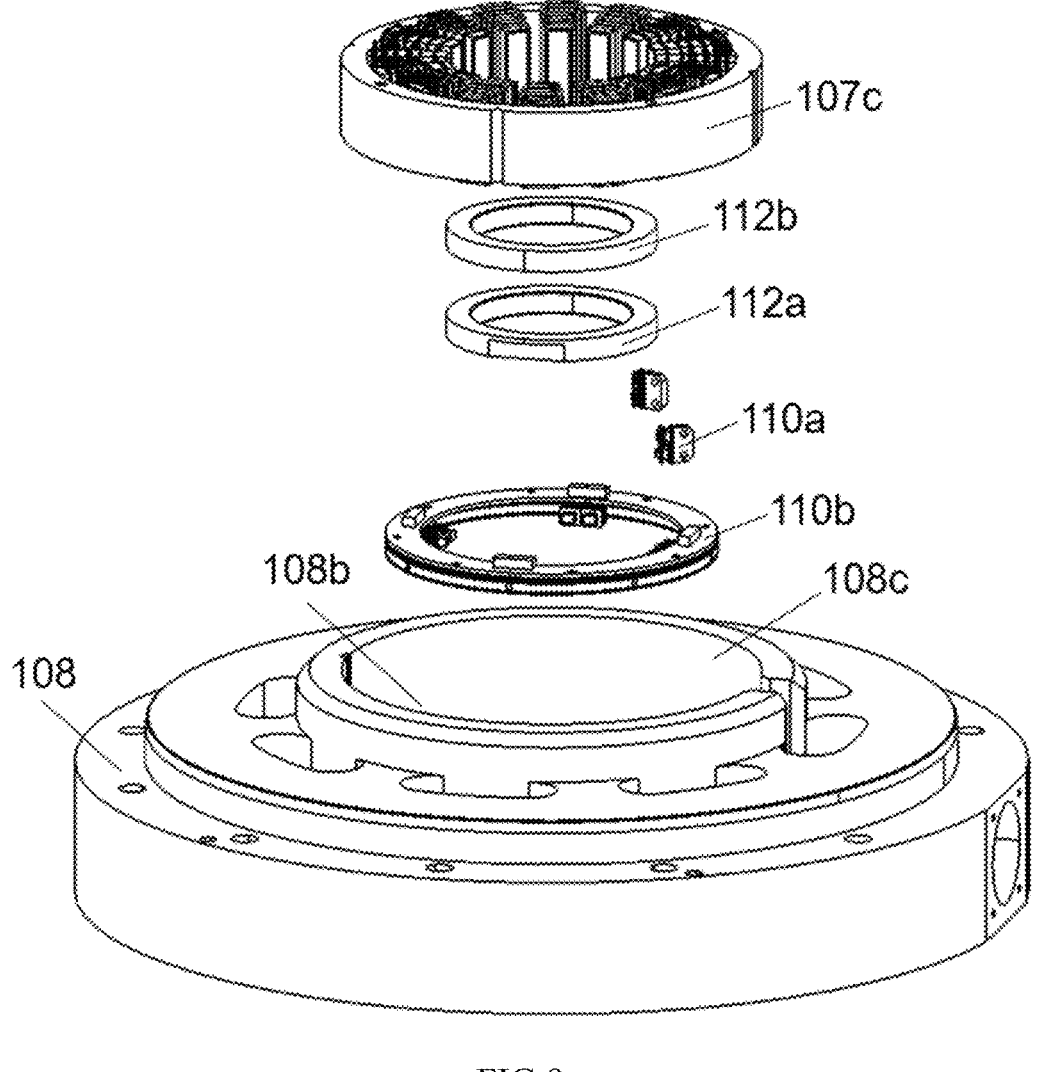
FIG. 9 is a schematic partial explosion diagram of the first shroud, the first position detection apparatus and the first radial bearing piece of the maglev air compressor of the present application.
Figure 10:
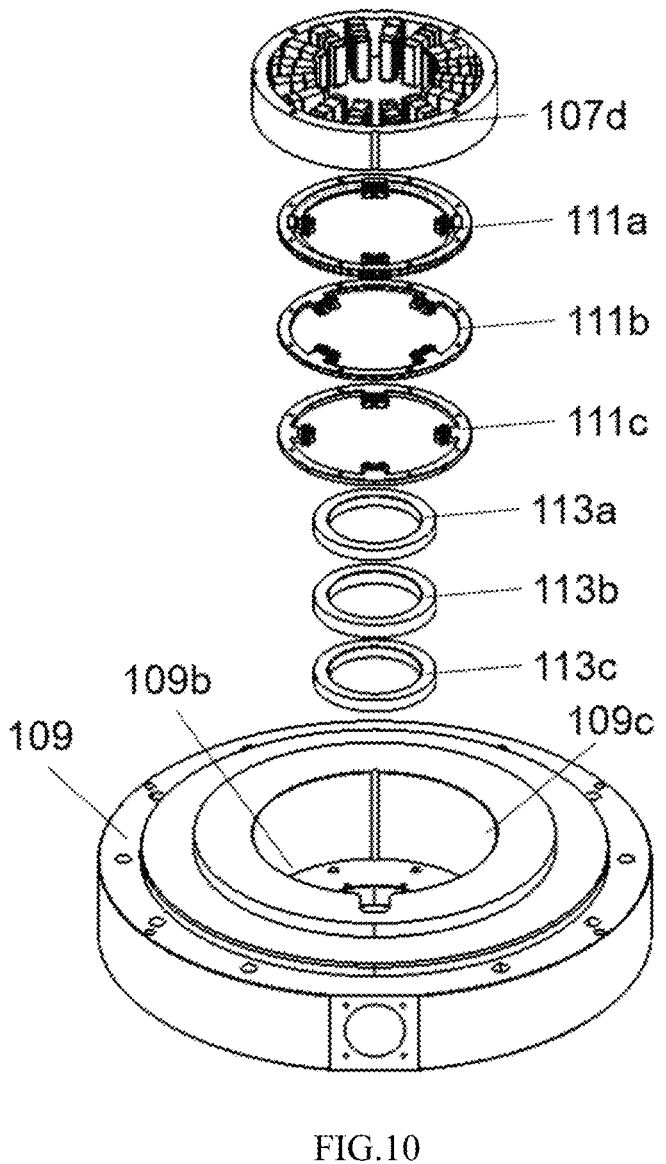
FIG. 10 is a schematic partial explosion diagram of the second shroud, the second position detection apparatus and the second radial bearing piece of the maglev air compressor of the present application.

Please refer to FIG. 9 and FIG. 10. FIG. 9 is a schematic partial explosion diagram of the first shroud, the first position detection apparatus and the first radial bearing piece of the maglev air compressor of the present application. FIG. 10 is a schematic partial explosion diagram of the second shroud, the second position detection apparatus and the second radial bearing piece of the maglev air compressor of the present application. In one embodiment, a first position detection apparatus mounting part 108b and a first radial bearing piece mounting part 108c are sequentially provided on the first shroud 108 along a direction away from the first impeller assembly 104. A second position detection apparatus mounting part 109b and a second radial bearing piece mounting part 109c are sequentially provided on the second shroud 109 along a direction away from the second impeller assembly 105.

The maglev bearing group 107 further includes the first radial bearing piece 107c and the second radial bearing piece 107d. The first radial bearing piece 107c and the second radial bearing piece 107d are provided on the first radial bearing piece mounting part 108c and the second radial bearing piece mounting part 109c, respectively, thus are installed inside the first shroud 108 and the second shroud 109. Both ends of the rotor 103 pass through the first radial bearing piece 107c and the second radial bearing piece 107d, and the first radial bearing piece 107c is provided between the first thrust bearing piece 107a and the motor stator 102, the second radial bearing piece 107d is provided between the second thrust bearing piece 107b and the motor stator 102. The first radial bearing piece 107c and the second radial bearing piece 107d are electrically connected to the control module 106. The control module 106 controls a magnitude and a direction of a current of the first radial bearing piece 107c and the second radial bearing piece 107d, thus generating corresponding magnetic fields, achieving a non-contact suspension between the rotor 103 and the motor stator 102. In one embodiment, the control module 106 is electrically connected to the first radial bearing piece 107c and the second radial bearing piece 107d, and controls the magnitude and the direction of the current of the first radial bearing piece 107c and the second radial bearing piece 107d.

In this embodiment, the maglev air compressor 1 further includes a first position detection apparatus 110 and a second position detection apparatus 111. The first position detection apparatus 110 and the second position detection apparatus 111 are provided on the first position detection apparatus mounting part 108b and the second position detection apparatus mounting part 109b, thus are installed inside the first shroud 108 and the second shroud 109. The first position detection apparatus 110 is provided between the first thrust bearing piece 107a and the first radial bearing piece 107c, and placed adjacent to the first radial bearing piece 107c. The second position detection apparatus 111 is provided between the second thrust bearing piece 107b and the second radial bearing piece 107d, and placed adjacent to the second radial bearing piece 107d. The first position detection apparatus 110 and the second position detection apparatus 111 are electrically connected to the control module 106. In one embodiment, the control module 106 is electrically connecting to the first position detection apparatus 110 and the second position detection apparatus 111.

In other embodiments, the first position detection apparatus 110 may be not placed adjacent to the first radial bearing piece 107c, and other structure such as a cooling structure is provided therebetween. The second position detection apparatus 111 may be not placed adjacent to the second radial bearing piece 107d, and other structure such as a cooling structure is provided therebetween.

The maglev air compressor 1 further includes the first sensing component 112 and the second sensing component 113. The first sensing component 112 and the second sensing component 113 are fixedly installed on rotating shafts on both ends of the rotor 103, respectively. The first position detection apparatus 110 and the second position detection apparatus 111 are provided around the first sensing component 112 and the second sensing component 113, respectively. The first sensing component 112 and the second sensing component 113 are fixedly installed on rotating shafts on both ends of the rotor 103, respectively, thus ensuring a synchronous rotation between the first sensing component 112 and the second sensing component 113 and the rotor 103. In one embodiment, the first sensing component 112 and the second sensing component 113 may be circular magnetic rings.

In one embodiment, the first position detection apparatus 110 includes a speed sensor 110a and a first radial sensor 110b. The second position detection apparatus 111 includes a first axial sensor 111a, a second radial sensor 111b and a second axial sensor 111c. The speed sensor 110a and the first radial sensor 110b are adjacently provided in the first position detection apparatus mounting part 108b along the axial direction of the rotor 103. The first axial sensor 111a, the second radial sensor 111b and the second axial sensor 111c are adjacently provided in the second position detection apparatus mounting part 109b along the axial direction of the rotor 103. The speed sensor 110a, the first radial sensor 110b, the first axial sensor 111a, the second radial sensor 111b and the second axial sensor 111c are all electrically connected to the control module 106. In one embodiment, the control module 106 is electrically connected to the speed sensor 110a, the first radial sensor 110b, the first axial sensor 111a, the second radial sensor 111b and the second axial sensor 111c.

Both the first axial sensor 111a and the second axial sensor 111c include at least one axial sensing element and an axial sensor mounting ring with an inner diameter larger than a diameter of the first sensing component 112. The number of the axial sensing element may be four, an inner ring of the axial sensor mounting ring protrudes toward a center to form at least one axial sensing element mounting boss, the number of the axial sensing element mounting boss is four correspondingly. The axial sensing element mounting boss are set symmetrically with respect to a center of the axial sensor mounting ring. The axial sensing element is match-mounted on the axial sensing element mounting boss. Of course, according to actual requirements, the number of the axial sensing element may be adaptively adjusted, and the number of the axial sensing element mounting boss may be subsequently adapted accordingly.

Both the first radial sensor 110b and the second radial sensor 111b include at least one radial sensing element and a radial sensor mounting ring with an inner diameter larger than a diameter of the second sensing component 113. The number of the radial sensing element may be four, an inner ring of the radial sensor mounting ring protrudes toward a center to form at least one radial sensing element mounting boss, the number of the radial sensing element mounting boss is four correspondingly. The radial sensing element mounting boss are set symmetrically with respect to a center of the radial sensor mounting ring. The radial sensing element is match-mounted on the radial sensing element mounting boss. Of course, according to actual requirements, the number of the radial sensing element may be subsequently adapted, and the number of the radial sensing element mounting boss may be subsequently adapted accordingly.

The first radial sensor 110b may be provided around the first sensing component 112, thus the first radial sensor 110b is provided along a circumferential direction of the first sensing component 112. The speed sensor 110a and the first radial sensor 110b are provided at intervals. The first axial sensor 111a, the second radial sensor 111b and the second axial sensor 111c are provided around the second sensing component 113, thus the first axial sensor 111a, the second radial sensor 111b and the second axial sensor 111c are provided along a circumferential direction of the second sensing component 113 at intervals.

The speed sensor 110a and the first radial sensor 110b are provided along the circumferential direction of the first sensing component 112 at intervals, to detect a rotation speed and radial displacement of the first sensing component 112 respectively, thus detecting a rotation speed and radial displacement of the rotor 103. The first axial sensor 111a, the second radial sensor 111b and the second axial sensor 111c are provided along the circumferential direction of the second sensing component 113 at intervals, to detect an axial displacement and the radial displacement of the rotor 103.

In this embodiment, the first sensing component 112 at least includes a first sub-sensing component 112a and a second sub-sensing component 112b. The first sub-sensing component 112a and the second sub-sensing component 112b are adjacently provided along the axial direction of the rotor 103. The sub-sensing component 112a is located at one side close to the speed sensor 110a. A notch is provided on the first sub-sensing component 112a. The speed sensor 110a is provided corresponding to the first sub-sensing component 112a. The first radial sensor 110b is provided along a circumferential direction of the second sub-sensing component 112b.

By disposing the speed sensor 110a corresponding to the first sub-sensing component 112a, the speed sensor 110a may detect a rotation speed of the first sub-sensing component 112a through detecting a rotation frequency of the notch of the first sub-sensing component 112a, thus deriving the rotation speed of the rotor 103. By providing the first radial sensor 110b along the circumferential direction of the second sub-sensing component 112b, when the rotor 103 undergoes radial displacement, the second sub-sensing component 112b also undergoes radial displacement synchronously, and the first radial sensor 110b detects a change of a magnetic field during the radial displacement of the second sub-sensing component 112b, thus achieving a detection of the radial displacement of the rotor 103.

The second sensing component 113 at least includes a third sub-sensing component 113a, a fourth sub-sensing component 113b and a fifth sub-sensing component 113c. The first axial sensor 111a is provided along a circumferential direction of a connection of the third sub-sensing component 113a and the fourth sub-sensing component 113b. The second radial sensor 111b is provided along a circumferential direction of the fourth sub-sensing component 113b. The second axial sensor 111c is provided along a circumferential direction of a connection of the fourth sub-sensing component 113b and the fifth sub-sensing component 113c.

When the rotor 103 undergoes axial displacement, the third sub-sensing component 113a, the fourth sub-sensing component 113b and the fifth sub-sensing component 113c also undergo axial displacement synchronously. The first axial sensor 111a and the second axial sensor 111c may detect a change of a magnetic field during the axial displacement of the third sub-sensing component 113a, the fourth sub-sensing component 113b and the fifth sub-sensing component 113c, thus achieving a detection of the axial displacement of the rotor 103. The present application detects the axial displacement of the rotor 103 through setting the first axial sensor 111a and the second axial sensor 111c simultaneously, effectively improving a detection accuracy of the axial displacement of the rotor 103. In other embodiments, according to demands of the accuracy of the detection, the number of the axial sensor may be subsequently adjusted.

A data of the axial displacement of the rotor 103 is detected in real time and fed back to the control module 106.

When the rotor 103 is axially displaced, the control module 106 may control the magnitude and the direction of the current of the first thrust bearing piece 107a and the second thrust bearing piece 107b according to a feedback information. So that the first thrust bearing piece 107a and the second thrust bearing piece 107b generate magnetic fields accordingly, generating the first axial magnetic force and the second axial magnetic force to the first impeller assembly 104 and the second impeller assembly 105 respectively. The sum of vectors of the first axial magnetic force and the second axial magnetic force is configured to counteract the axial force generated during the high-speed rotation of the rotor 103. The first axial sensor 111a and the second axial sensor 111c collect a position information of the rotor 103 again, and submit to the control module 106 to generate a current command, controlling the magnitude and the direction of the current flowing through the first thrust bearing piece 107a and the second thrust bearing piece 107b, thus adjusting a position of the rotor 103. By reciprocally cycling, "a closed-loop control" is formed, thus the rotor 103 is dynamically suspended at a desired position.

The second radial sensor 111b is provided along the circumferential direction of the fourth sub-sensing component 113b. When the rotor 103 is radially displaced, the fourth sub-sensing component 113b is radially displaced synchronously. The second radial sensor 111b may detect a change of a magnetic field during the radially displacement of the fourth sub-sensing component 113b, thus achieving a detection of the axial displacement of the rotor 103. In the present application, by providing the first radial sensor 110b and the second radial sensor 111b to detect the axial displacement of the rotor 103 simultaneously, the detection accuracy of the axial displacement of the rotor 103 is effectively improved. In other embodiments, according to actual demands of the detection accuracy, the number of the axial sensor may be subsequently adjusted.

By detecting a data of the axial displacement of the rotor 103 at real time and feeding back to the control module 106, the control module 106 may control the magnitude and the direction of the current flowing through the first radial bearing piece 107c and the second radial bearing piece 107d according to a feedback information. So that the first radial bearing piece 107c and the second radial bearing piece 107d generate magnetic fields accordingly, generating a magnetic force corresponding to the force received by the rotor 103, thus the rotor 103 is suspended at a relatively stable position. For example, when the rotor 103 is located at a lower position, an upper coil current of the first radial bearing piece 107c or the second radial bearing piece 107d needs to be increased, and a lower coil current thereof needs to be decreased, thus forming a difference in electromagnetic force between upper and lower sides to "lift" the rotor 103 upward.

Figure 11:
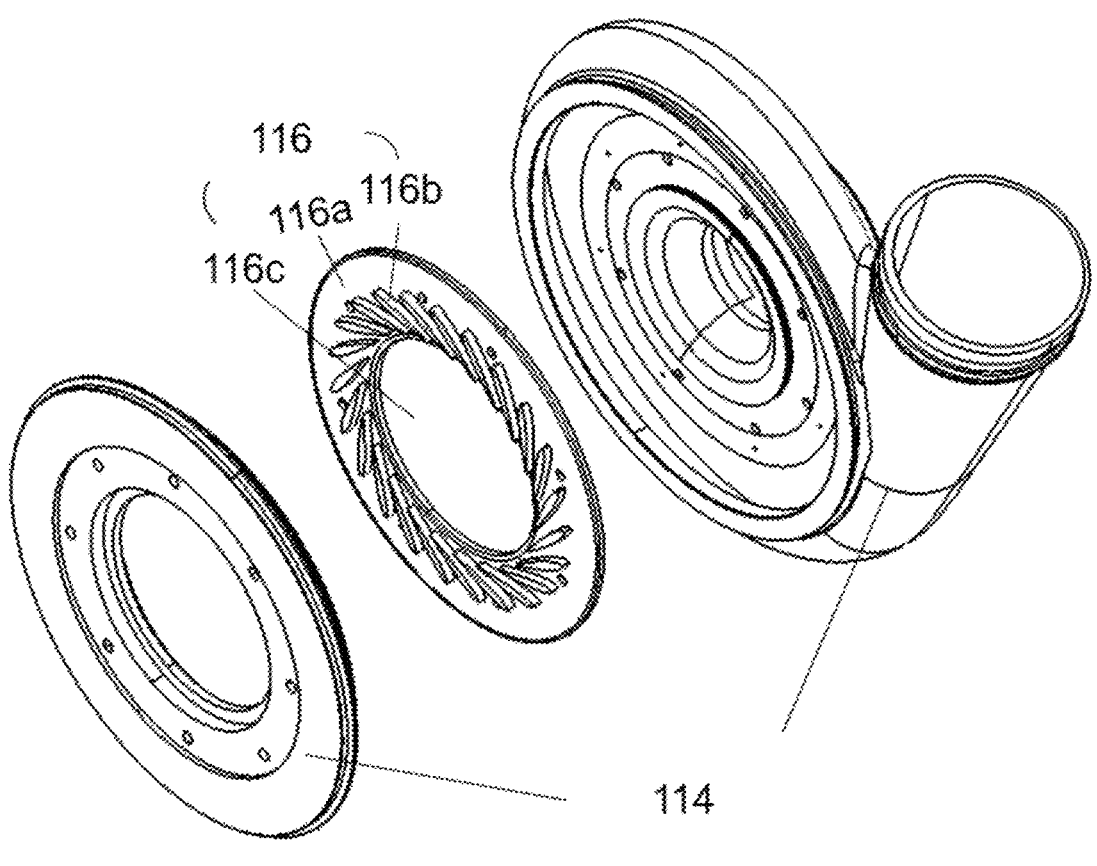
FIG. 11 is a schematic explosion diagram of the first volute of the maglev air compressor of the present application.
Figure 12:
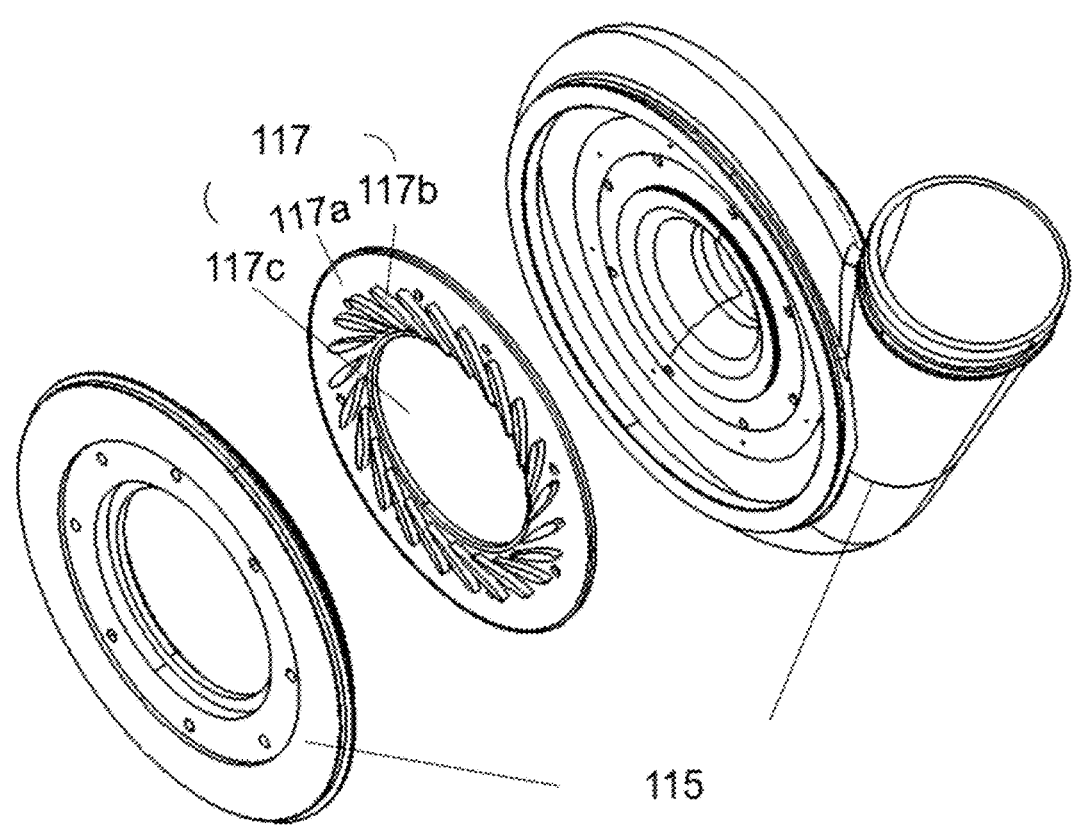
FIG. 12 is a schematic explosion diagram of the second volute of the maglev air compressor of the present application.

Please refer to FIG. 11 and FIG. 12. FIG. 11 is a schematic explosion diagram of the first volute of the maglev air compressor of the present application. FIG. 12 is a schematic explosion diagram of the second volute of the maglev air compressor of the present application.

In one embodiment, the maglev air compressor 1 further includes the first volute 114, the second volute 115, a first air diffusing assembly 116 and a second air diffusing assembly 117. The first volute 114 is in close contact with one side of the first shroud 108 away from the compressor housing 101 and is detachably assembled to the first shroud 108. The second volute 115 is in close contact with one side of the second shroud 109, and is detachably assembled to the second shroud 109. The first air diffusing assembly 116 and the second air diffusing assembly 117 are provided in the first volute 114 and the second volute 115, respectively. A first impeller mounting perforation and a second impeller mounting perforation are provided on centers of the first air diffusing assembly 116 and the second air diffusing assembly 117, respectively. The first impeller assembly 104 and the second impeller assembly 105 pass through the first impeller mounting perforation and the second impeller mounting perforation, respectively, and are provided in the first volute 114 and the second volute 115. An air inlet gap is provided between the first impeller assembly 104 and the first impeller mounting perforation, between the second impeller assembly 105 and the second impeller mounting perforation, respectively.

A high-speed rotation of the first impeller assembly 104 or the second impeller assembly 105 drives air to rotate at a high-speed and enter the first volute 114 or the second volute 115 through the air inlet gap. When high-speed rotating air passes through the first air diffusing assembly 116 or the second air diffusing assembly 117, the first air diffusing assembly 116 or the second air diffusing assembly 117 provides an auxiliary pressurization to the high-speed rotating air, and a compressed air exits from the first volute 114 and the second volute 115, respectively.

In this embodiment, a first air diffusing assembly mounting portion and a second air diffusing assembly mounting portion are provided on the first volute 114 and the second volute 115, respectively. The first air diffusing assembly 116 includes a first annular base 116a and at least one first air stop sheet 116b provided on one end of the first annular base 116a, one side of the first annular base 116a provided without the first air stop sheet 116b is match-mounted to the first air diffusing assembly mounting portion. A first impeller mounting perforation 116c is provided on a center of the first annular base 116a. The first air stop sheet 116b is arranged along a circumferential direction of the first impeller mounting perforation 116c. An arrangement direction of the first air stop sheet 116b is opposite to a bending direction of arc-shaped blades on the first impeller assembly 104. The bending direction of the arc-shaped blades on the first impeller assembly 104 may be a clockwise direction, the arrangement direction of the first air stop sheet 116b may be a counterclockwise direction.

The second air diffusing assembly 117 includes a second annular base 117a and at least one second air stop sheet 117b provided on one end of the second annular base 117a. The second air stop sheet 117b is provided opposite to the second impeller assembly 105. One side of the second annular base 117a provided without the second air stop sheet 117b is match-mounted to the second air diffusing assembly mounting portion. A second impeller mounting perforation 117c is provided on a center of the second annular base 117a. The second air stop sheet 117b is arranged along a circumferential direction of the second impeller mounting perforation 117c. An arrangement direction of the second air stop sheet 117b is opposite to a bending direction of arc-shaped blades on the second impeller assembly 105. The bending direction of the arc-shaped blades on the second impeller assembly 105 may be a counterclockwise direction, the arrangement direction of the second air stop sheet 117b may be a clockwise direction.

The high-speed rotation of the first impeller assembly 104 drives the high-speed rotation of the air in a clockwise direction. Since the first air diffusing assembly 116 is match-mounted to the first air diffusing assembly mounting portion through the side of the first annular base 116a provided without the first air stop sheet 116b, that is, the first air stop sheet 116*b* faces away from the arc-shaped blades on the first impeller assembly 104, thus after the high-speed rotating air in the clockwise direction enters the first volute 114 through the air inlet gap, a rotation direction of the high-speed rotating air in the clockwise direction is same as the arrangement direction of the first air stop sheet 116*b*, so that the high-speed rotating air in the clockwise direction may spirally rotates along the first air stop sheet 116*b*, achieving an auxiliary pressurization of air by the first air diffusing assembly 116. A principle of an auxiliary pressurization of air by the second air diffusing assembly 117 is the same as the principle of the auxiliary pressurization of air by the first air diffusing assembly 116, and thus, the description thereof will be omitted.

Of course, in other embodiments, in a case of ensuring that the arrangement direction of the first air stop sheet 116*b* is opposite to a bending direction of arc-shaped blades on the first impeller assembly 104 and the arrangement direction of the second air stop sheet 117*b* is opposite to a bending direction of arc-shaped blades on the second impeller assembly 105, the arrangement direction of the air stop sheet of the first air diffusing assembly 116 and the arrangement direction of the air stop sheet of the second air diffusing assembly 117 may be adaptively adjusted.

Figure 13:
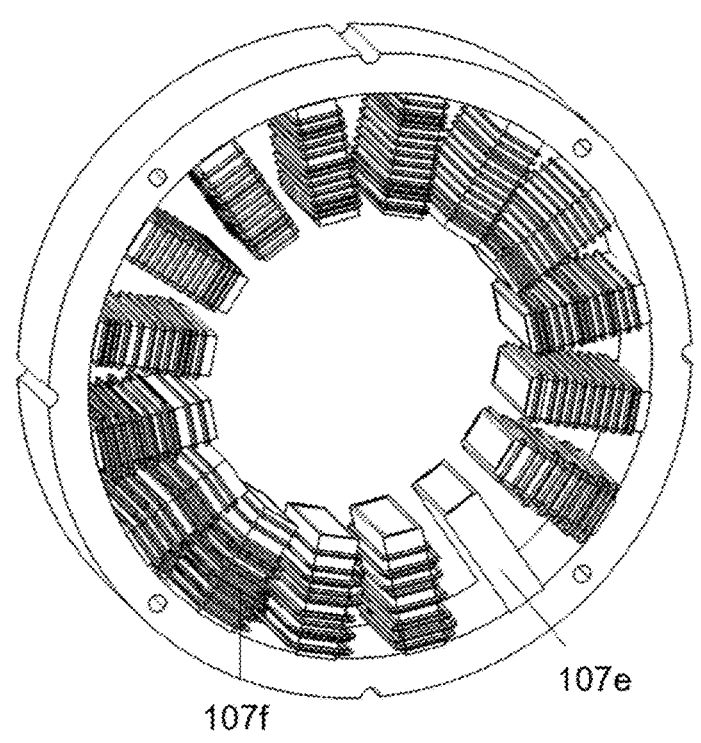
FIG. 13 is a schematic structure diagram of the first radial bearing piece of the maglev air compressor of the present application.

A structure of the second radial bearing piece 107*d* is the same as a structure of the first radial bearing piece 107*c*. Please refer to FIG. 13, FIG. 13 is a schematic structure diagram of the first radial bearing piece of the maglev air compressor of the present application. In this embodiment, the first radial bearing piece 107*c* includes a first radial bearing base 107*e* and several coils 107*f*. The second radial bearing piece 107*d* includes a second radial bearing base (not shown in FIGS.) and several coils (not shown in FIGS.). Inner rings of the first radial bearing base 107*e* and the second radial bearing base are protrudes towards a center thereof, forming several coil mounting bosses (not shown in FIGS.). The several coils 107*f* of the first radial bearing piece 107*c* and the coils of the second radial bearing piece 107*d* are provided around the coil mounting bosses of the first radial bearing base 107*e* and the second radial bearing base at intervals. Wherein, the first radial bearing base 107*e* and the second radial bearing base are formed by superimposing insulated silicon steel sheets. A resistivity of the insulated silicon steel sheet material is increased and reduces an eddy current, thus decrease a temperature rise of the first radial bearing piece 107*c* and the second radial bearing piece 107*d*, therefore it is not necessary to provide an additional water cooling assembly for the first radial bearing piece 107*c* and the second radial bearing piece 107*d*.

Figure 14:
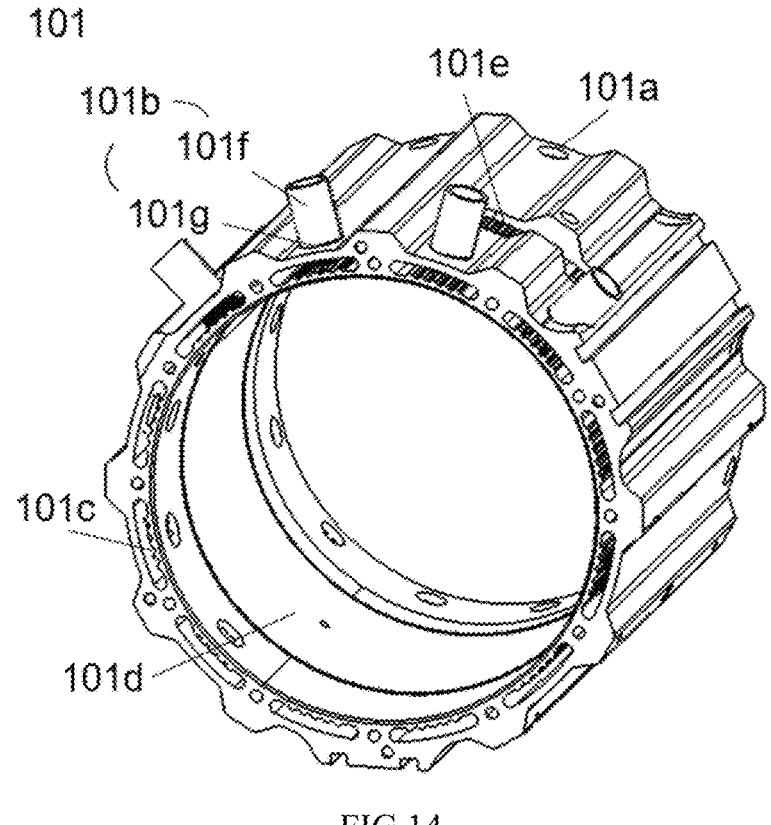
FIG. 14 is a schematic structure diagram of a compressor housing of the maglev air compressor of the present application.
Figure 15:
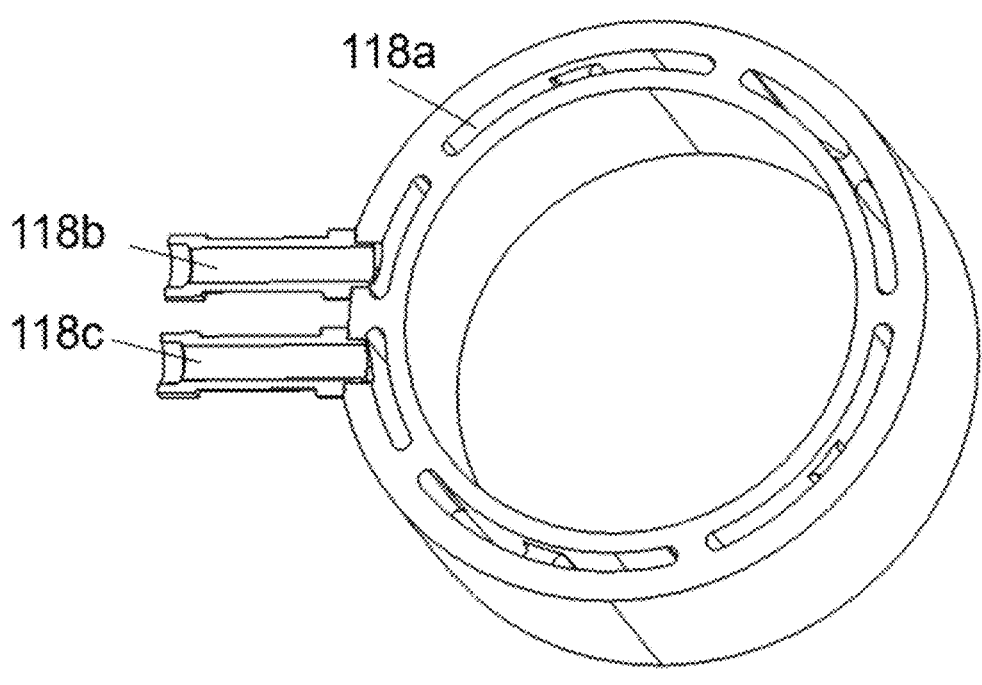
FIG. 15 is a schematic cross-sectional diagram of an annular water cooling assembly of the maglev air compressor of the present application.

In one embodiment, please refer to FIG. 14 and FIG. 15, FIG. 14 is a schematic structure diagram of the compressor housing of the maglev air compressor of the present application, FIG. 15 is a schematic cross-sectional diagram of an annular water cooling assembly of the maglev air compressor of the present application. The maglev air compressor 1 further includes the annular water cooling assembly 118. The compressor housing 101, the annular water cooling assembly 118 and the motor stator 102 are sequentially sleeved from outside to inside. An air passage is formed between the motor stator 102 and the rotor 103. At least one air inlet interface 101*a* and air outlet interface 101*b* communicated with the air passage are provided on the compressor housing 101. A water cooling passage 118*a* is provided in the annular water cooling assembly 118, and an inner wall of the annular water cooling assembly 118 separates the water cooling passage 118*a* and the motor stator 102. A water inlet interface 118*b* and a water outlet interface 118*c* communicated with the water cooling passage 118*a* are provided on the annular water cooling assembly 118. A water cooling interface perforation 101*e* is provided on the compressor housing 101, the water cooling interface perforation 101*e* may be an through-hole structure provided on the compressor housing 101. The water inlet interface 118*b* and the water outlet interface 118*c* pass through the water cooling interface perforation 101*e* and extend out. Of course, according to actual requirements, the water cooling interface perforation 101*e* may be a blind-hole structure. A refrigerant enters the water cooling passage 118*a* through the water inlet interface 118*b*, and flows through the water cooling passage 118*a*, and finally flows out through the water outlet interface 118*c*. During a process of a flowing of the refrigerant in the water cooling passage 118*a*, a water cooling heat dissipation of the motor stator 102 through the annular water cooling assembly 118 is achieved.

In the present application, the rotor 103 is suspended in the motor stator 102 through the magnetic force and form the air passage with the motor stator 102 therebetween. By providing at least one air inlet interface 101*a* and air outlet interface 101*b* communicated with the air passage on the compressor housing 101, and by making an air pressure at the air inlet interface 101*a* larger than that at the air outlet interface 101*b*, the air flows into the maglev air compressor 1 through the air inlet interface 101*a*, then flows through the air passage formed between the motor stator 102 and the rotor 103, and finally flows out through the air outlet interface 101*b*, achieving an air cooling heat dissipation of the motor stator 102 and the rotor 103.

In addition, in the present application, an individual annular water cooling assembly 118 is sleeved in the compressor housing 101, the motor stator 102 is sleeved in the annular water cooling assembly 118, the water inlet interface 118*b* and the water outlet interface 118*c* are communicated with the water cooling passage 118*a* in the annular water cooling assembly 118 through the water cooling interface perforation 101*e* on the compressor housing 101, the refrigerant enters the water cooling passage 118*a* through the water inlet interface 118*b*, and flows through the water cooling passage 118*a*, finally flows out through the water outlet interface 118*c*. During a process of the flowing of the refrigerant in the water cooling passage 118*a*, the water cooling heat dissipation of the motor stator 102 by the annular water cooling assembly 118 is achieved.

In the present application, by individually providing the annular water cooling assembly 118, a maintenance of the annular water cooling assembly 118 is facilitated. When in the maintenance of the annular water cooling assembly 118, the air inlet interface 101*a* and the air outlet interface 101*b* provided on the compressor housing 101 may still operate normally, that is, the air cooling heat dissipation of the maglev air compressor 1 of the present application may still operate normally.

In addition, an adoption of the air cooling heat dissipation and the water cooling heat dissipation above-mentioned may meet heat dissipation requirements of the maglev air compressor in the present application. Since no additional space is required to install heat dissipation apparatus for the first thrust bearing piece 107*a*, the second thrust bearing piece 107*b*, the first radial bearing piece 107*c* and the second radial bearing piece 107*d*, a length of the rotor 103 and a whole machine may be further shorten, a rigid of the rotor 103 is improved, thus improving a critical rotation speed of the rotor 103, and effectively improving a pressure value of compressed air in the maglev air compressor 1.

In this embodiment, an annular water cooling assembly mounting recess 101d is provided in the compressor housing 101. An inner diameter of the compressor housing 101 at the water cooling assembly mounting recess 101d is larger than other inner diameters at other positions of the compressor housing 101. The annular water cooling assembly 118 is detachably assembled in the water cooling assembly mounting recess 101d. In this embodiment, the annular water cooling assembly 118 is detachably assembled in the annular water cooling assembly mounting recess 101d through screw fixing. The motor stator 102 is detachably sleeved in the annular water cooling assembly 118. By detachably assembling the annular water cooling assembly 118 in the compressor housing 101, it is convenient to disassemble and repair the annular water cooling assembly 118 alone without affecting the normal operation of the air cooling and heat dissipation of the maglev air compressor of the present application. Of course, in other embodiments, according to actual needs, the annular water cooling assembly 118 may also be detachably assembled in the water cooling assembly mounting recess 101d through a snap-fit method.

In this embodiment, the water cooling passage 118a is arranged around a circumferential direction of the annular water cooling assembly 118 in a S shape. The water inlet interface 118b and the water outlet interface 118c are communicated with both ends of the water cooling passage 118a. The water inlet interface 118b and the water outlet interface 118c are communicated with both ends of the water cooling passage 118a through arranging the water cooling passage 118a around the circumferential direction of the annular water cooling assembly 118 in the S shape, increasing a flowing path length of the refrigerant, further improving a water cooling head dissipation capacity of the annular water cooling assembly.

In one embodiment, the water cooling passage 118a further includes at least one water cooling sub-passage. The number of water cooling sub-passages may be ten, and a shape of a radial cross-section of the water cooling sub-passage is a circular arc shape. The water cooling sub-passage is provided parallel to an axis of the annular water cooling assembly 118. The water cooling sub-passages are arranged around the circumferential direction of the annular water cooling assembly 118 in the S shape after being connected end to end. The water inlet interface 118b and the water outlet interface 118c are communicated with any two adjacent water cooling sub-passages, respectively. By communicating both ends of the adjacent water cooling sub-passages and arranging the water cooling sub-passages around the circumferential direction of the annular water cooling assembly 118 in the S shape, the flowing path length of the refrigerant is increased, allowing the refrigerant to flow evenly within the cooling structure, further improving the water cooling head dissipation capacity of the annular water cooling assembly 118. Of course, in other embodiments, according to actual requirements of heat dissipation, the number of the water cooling sub-passages may be adaptively adjusted.

In this embodiment, several air inlet interfaces 101a are provided around one end of the compressor housing 101, and several air outlet interface 101b are provided on the other end of the compressor housing 101. The number of the air inlet interfaces 101a is ten, the number of the air outlet interfaces 101b is four. The air inlet interfaces 101a are air inlet through holes passing through the compressor housing 101 from outside to inside. The air outlet interfaces 101b include an air outlet through hole 101g passing through the compressor housing 101 from outside to inside and an air outlet passage 101f communicated with the air outlet through hole 101g. Of course, according to actual requirements of heat dissipation, the number of the air inlet interfaces 101a and the air outlet interfaces 101b may be adaptively adjusted.

The air inlet interface 101a and the air outlet interface 101b are provided at both ends of the compressor housing 101, maximizing a length of an air flow path in the maglev air compressor. An exhaust fan is connected to the air outlet passage 101f. When the exhaust fan starts working, air is extracted from the air outlet passage 101f, thus an atmospheric pressure at the air outlet interface 101b is smaller than an atmospheric pressure at the air inlet interface 101a. So that the air flow enters the maglev air compressor 1 of the present application from the air inlet interface 101a, passes through the air passage formed between the motor stator 102 and the rotor 103, and finally flows out from the air outlet interface 101b. When the air flow passes through the air passage formed between the motor stator 102 and the rotor 103, by a fully contact with the motor stator 102 and the rotor 103, heat of the motor stator 102 and the rotor 103 is taken away, completing an air-cooling heat dissipation of the motor stator 102 and the rotor 103.

When the air cooling heat dissipation and the water cooling heat dissipation of the maglev air compressor 1 of the present application are working simultaneously, during a process of the air flow from the air inlet interface 101a to the air outlet interface 101b, part of the air flow is contacted with the annular water cooling assembly 118, thus the air flow may be cooled by the annular water cooling assembly 118. Therefore, when the air flow after cooling passes through the air passage formed between the motor stator 102 and the rotor 103, an effect of an air flow heat dissipation of the air flow to the motor stator 102 and the rotor 103 is further increased.

The present application is not limited to the above-mentioned implementations. If those various modifications and deformations do not depart from the spirit of the present application, and those modifications and deformations fall within the scope of the claims and equivalent technique ranges of the present application, then the present application is intended to include these modifications and deformations.

What is claimed:

1. A maglev air compressor, comprising:
   a compressor housing, a motor stator, a rotor, a first impeller assembly and a second impeller assembly subjectable to an axial magnetic force, a control module, a first shroud, a second shroud, a first position detection apparatus, a second position detection apparatus, a first sensing component and a second sensing component, wherein, the compressor housing, the motor stator and the rotor are sleeved sequentially, both ends of the rotor are rotatably connected to an inside of the compressor housing through a maglev bearing group, the first impeller assembly and the second impeller assembly are fixedly oppositely installed on the both ends of the rotor;
   wherein, the maglev bearing group includes: a first thrust bearing piece generating a first axial magnetic force to the first impeller assembly, and, a second thrust bearing piece generating a second axial magnetic force to the second impeller assembly, the control module is electrically connected to the first thrust bearing piece and the second thrust bearing piece respectively; the control module controls the first thrust bearing piece and the second thrust bearing piece respectively to generate the first axial magnetic force and the second axial magnetic force to the first impeller assembly and the second impeller assembly; wherein, a sum of vectors of the first axial magnetic force and the second axial magnetic force is configured to counteract an axial force received by the rotor;

wherein one end of the first shroud and one end of the second shroud are respectively assembled to both ends of the compressor housing; the first thrust bearing piece and the second thrust bearing piece are assembled to one end of the first shroud and one end of the second shroud away from the compressor housing respectively, the both ends of the rotor pass through the first shroud and the second shroud, the first thrust bearing piece and the second thrust bearing piece and are assembled to a corresponding impeller assembly respectively, a movable gap is provided between the first thrust bearing piece and the bottom of the corresponding impeller assembly and between the second thrust bearing piece and the bottom of the corresponding impeller assembly;

wherein the maglev bearing group further includes a first radial bearing piece and a second radial bearing piece, the first radial bearing piece and the second radial bearing piece are installed in the first shroud and the second shroud respectively, the both ends of the rotor pass through the first radial bearing piece and the second radial bearing piece, and the first radial bearing piece is provided between the first thrust bearing piece and the motor stator, the second radial bearing piece is provided between the second thrust bearing piece and the motor stator; both the first radial bearing piece and the second radial bearing piece are electrically connected to the control module;

wherein the first position detection apparatus and the second position detection apparatus are installed in the first shroud and the second shroud respectively; the first position detection apparatus is provided between the first thrust bearing piece and the first radial bearing piece; the second position detection apparatus is provided between the second thrust bearing piece and the second radial bearing piece; both the first position detection apparatus and the second position detection apparatus are electrically connected to the control module;

wherein the first sensing component and the second sensing component are fixedly installed on a rotating shaft on the both ends of the rotor respectively; the first position detection apparatus and the second position detection apparatus are provided around the first sensing component and the second sensing component respectively;

wherein the first position detection apparatus includes a speed sensor and a first radial sensor, the second position detection apparatus includes a first axial sensor, a second radial sensor and a second axial sensor; the speed sensor and the first radial sensor are sequentially provided along a circumferential direction of the first sensing component at intervals; the first axial sensor, the second radial sensor and the second axial sensor are sequentially provided along a circumferential direction of the second sensing component at intervals; the speed sensor, the first radial sensor, the first axial sensor, the second radial sensor and the second axial sensor are all electrically connected to the control module.

2. The maglev air compressor of claim 1, wherein, the first thrust bearing piece and the first impeller assembly are adjacently provided along an axial direction of the rotor respectively, and the first thrust bearing piece is located at an inner side of the first impeller assembly; the second thrust bearing piece and the second impeller assembly are adjacently provided along the axial direction of the rotor respectively, and the second thrust bearing piece is located at an inner side of the second impeller assembly.

3. The maglev air compressor of claim 1, wherein,
the first impeller assembly includes a first impeller made by magnetic material, the second impeller assembly includes a second impeller made by magnetic material; or, the first impeller assembly includes the first impeller and a first magnetic piece, the first magnetic piece is installed in the first impeller; the second impeller assembly includes the second impeller and a second magnetic piece, the second magnetic piece is installed in the second impeller.

4. The maglev air compressor of claim 3, wherein, the magnetic material is a ferromagnetic metal or a ferromagnetic alloy.

5. The maglev air compressor of claim 3, wherein, both the first magnetic piece and the second magnetic piece are magnets, ferromagnetic metals or ferromagnetic alloys; a first groove is provided on a side surface of the first impeller facing the second impeller assembly, the first magnetic piece is snap-fittedly installed into the first groove, a second groove is provided on a side surface of the second impeller facing the first impeller assembly, the second magnetic piece is snap-fittedly installed into the second groove.

6. The maglev air compressor of claim 5, wherein, both the first groove and the second groove are annular grooves, both the first magnetic piece and the second magnetic piece are in annular shapes.

7. The maglev air compressor of claim 3, wherein, both the first magnetic piece and the second magnetic piece are magnetic coatings, the first magnetic piece is evenly coated on the bottom of the first impeller, the second magnetic piece is evenly coated on the bottom of the second impeller.

8. The maglev air compressor of claim 1, further comprising a first volute, a second volute, a first air diffusing assembly and a second air diffusing assembly, wherein, the first volute is in contacted with one side of the first shroud and is detachably assembled to the first shroud; the second volute is in contacted with one side of the second shroud and is detachably assembled to the second shroud; the first air diffusing assembly and the second air diffusing assembly are installed in the first volute and the second volute respectively, a first impeller mounting perforation and a second impeller mounting perforation are provided on centers of the first air diffusing assembly and the second air diffusing assembly respectively; the first impeller assembly and the second impeller assembly pass through the first impeller mounting perforation and the second impeller mounting perforation and are provided in the first volute and the second volute respectively; and an air inlet gap is provided between the first impeller assembly and the first impeller mounting perforation and between the second impeller assembly and the second impeller mounting perforation respectively.

9. The maglev air compressor of claim 8, wherein, a first air diffusing assembly mounting portion and a second air diffusing assembly mounting portion are provided on the first volute and the second volute respectively, the first air diffusing assembly includes a first annular base and at least one first air stop sheet provided on one end of the first annular base, one side of the first annular base provided without the first air stop sheet is match-mounted to the first air diffusing assembly mounting portion, the first impeller mounting perforation is provided on a center of the first annular base, the first air stop sheet is arranged at intervals along a circumferential direction of the first impeller mounting perforation, an arrangement direction of the first air stop sheet is opposite to a bending direction of arc-shaped blades on the first impeller assembly; the second air diffusing assembly includes a second annular base and at least one second air stop sheet provided on one end of the second annular base, one side of the second annular base provided without the second air stop sheet is match-mounted to the second air diffusing assembly mounting portion, the second impeller mounting perforation is provided on a center of the second annular base, the second air stop sheet is arranged at intervals along a circumferential direction of the second impeller mounting perforation, an arrangement direction of the second air stop sheet is opposite to a bending direction of arc-shaped blades on the second impeller assembly.

10. The maglev air compressor of claim 1, wherein, the first radial bearing piece includes a first radial bearing base and several coils, the second radial bearing piece includes a second radial bearing base and several coils, inner rings of the first radial bearing base and the second radial bearing base are protrudes towards a center thereof, forming several coil mounting bosses, the several coils of the first radial bearing piece and the coils of the second radial bearing piece are provided around the coil mounting bosses of the first radial bearing base and the second radial bearing base at intervals; wherein, the first radial bearing base and the second radial bearing base are formed by superimposing insulated silicon steel sheets.

11. The maglev air compressor of claim 1, further comprising an annular water cooling assembly, wherein, the compressor housing, the annular water cooling assembly and the motor stator are sequentially sleeved; an air passage is formed between the motor stator and the rotor, at least one air inlet interface and at least one air outlet interface that communicate with the air passage are provided on the compressor housing; a water cooling passage is provided in the annular water cooling assembly, a water inlet interface and a water outlet interface that communicate with the water cooling passage are provided on the annular water cooling assembly, a water cooling interface perforation is provided on the compressor housing, the water inlet interface and the water outlet interface pass through the water cooling interface perforation and extend out.

12. The maglev air compressor of claim 11, wherein, the water cooling passage is arranged around a circumferential direction of the annular water cooling assembly in a S shape, the water inlet interface and the water outlet interface are communicated with both ends of the water cooling passage respectively.

13. The maglev air compressor of claim 11, wherein, several air inlet interfaces are provided around one end of the compressor housing, several air outlet interfaces are provided on the other end of the compressor housing; both the air inlet interfaces and the air outlet interfaces pass through an outer wall and an inner wall of the compressor housing; the air inlet interfaces are air inlet through holes pass through the compressor housing from outside to inside; the air outlet interfaces include an air outlet through hole passes through the compressor housing from outside to inside and an air outlet passage that communicates with the air outlet through hole.

* * * * *